United States Patent [19]

Böhm

[11] Patent Number: 5,159,959

[45] Date of Patent: Nov. 3, 1992

[54] DOUBLE FEEDBACK PACKING SYSTEM FOR PASTY MATERIAL

[75] Inventor: Jürgen Böhm, Kaarst, Fed. Rep. of Germany

[73] Assignee: Benz & Hilgers GmbH, Düsseldorf, Fed. Rep. of Germany

[21] Appl. No.: 614,909

[22] Filed: Nov. 16, 1990

[30] Foreign Application Priority Data

Nov. 17, 1989 [DE] Fed. Rep. of Germany ....... 3938220

[51] Int. Cl.⁵ .......................... B65B 1/04; B65B 3/04
[52] U.S. Cl. ........................................... 141/1; 141/83; 141/266; 177/50; 53/502; 53/503
[58] Field of Search ................ 141/1, 12, 83, 73, 177, 141/266; 177/50; 53/502, 503

[56] References Cited

U.S. PATENT DOCUMENTS

| | | | |
|---|---|---|---|
| 3,786,844 | 1/1974 | Smearsoll et al. | 141/83 |
| 4,520,883 | 6/1985 | Fukuda | 177/50 |
| 4,548,286 | 10/1985 | Sashiki et al. | 177/50 |
| 4,635,688 | 1/1987 | Graffin | 141/83 |
| 4,635,689 | 1/1987 | Graffin | 141/83 |
| 4,657,094 | 4/1987 | Mosher et al. | 53/503 |
| 4,696,329 | 9/1987 | Izzi | 177/50 |
| 4,793,420 | 12/1988 | Hirano | 177/50 |
| 4,878,522 | 11/1989 | Ostrander | 141/83 |
| 4,972,882 | 11/1990 | Kohashi | 141/83 |
| 4,997,012 | 3/1991 | Kuziw | 141/83 |
| 5,002,102 | 3/1991 | Hösel | 141/83 |

FOREIGN PATENT DOCUMENTS 724527 2/1955 United Kingdom .

OTHER PUBLICATIONS

Packaging Digest, vol. 32, Dec. 1961, pp. 54–58.
"Ingenious Weight-Control System", article from Packaging—Dec. 1961, 5 pages.

Primary Examiner—Henry J. Recla
Assistant Examiner—Keith Kupferschmid
Attorney, Agent, or Firm—Herbert Dubno; Andrew M. Wilford

[57] ABSTRACT

In a packaging system where a pasty material is dosed as portions into individual containers to form individual packages, at least one dimension of the portions is measured to produce actual-value outputs that correspond to the volumes of the respective packages and that are compared with a set point corresponding to a desired volume. The dosing of the portions is altered on deviation of the volume outputs from the volume set point so as to bring same into agreement. In addition the packages are weighed downstream to produce actual-value outputs that correspond to the weights of the packages and that are compared with a set point corresponding to a desired weight. The volume set point is then altered on deviation of the weight outputs from the weight set point by increasing the volume set point when the actual-value weight outputs are below the weight set point and decreasing the volume set point when the actual-value weight outputs are above the weight set point until the actual-value weight outputs are generally the same as the weight set point.

6 Claims, 4 Drawing Sheets

DOUBLE FEEDBACK PACKING SYSTEM FOR PASTY MATERIAL

FIELD OF THE INVENTION

The present invention relates to a system for making packages of a pasty or viscous material. More particularly this invention concerns a method of and apparatus for forming individual small packages of butter, soup paste, or the like.

BACKGROUND OF THE INVENTION

In the mass production of small individually wrapped packages of butter, margarine, soup paste, or the like it is important that the packages all contain the same amount of whatever viscous or pasty material they contain. Accordingly it is standard to provide feedback control for the dosing device that fills the individual portions into the container. Downstream of the filling station a weighing station is provided which compares the gross weights of the individual packages with a set point and produces on deviation an error signal that is used to adjust the dosing device to eliminate this deviation. Such a system has the considerable disadvantage that there is a considerable delay between the time the package is made up and when its weight is checked, so that if the machine is starting to produce, for instance, undersized portions, the correction at the doser takes place after quite a few packages, which must be rejected, have been made. This problem is even more critical when very small packages are being made, for instance individually packed butter patties.

In German patent document 3,232,185 filed Aug. 30, 1982 by E. Muller a system is described where a piston-type doser forces individual portions of a viscous or pasty material, in this case sausage meat or headcheese, into individual containers, here sausage casings. In this arrangement the back pressure on the piston operating the dosing device is monitored to determine the specific gravity of the material being dosed. From this parameter it is possible to reliably gauge the mass of the portion being dosed.

Such a system offers some advantages, but still does not lend itself readily to a fast-acting mass-production operation that produces a large quantity of small packages.

OBJECTS OF THE INVENTION

It is therefore an object of the present invention to provide an improved system for packaging a pasty material.

Another object is the provision of such an improved system for packaging a pasty material which overcomes the abovegiven disadvantages, that is which is capable of producing packages of uniform weight at a high production speed, even when the packages are very small.

SUMMARY OF THE INVENTION

In a packaging system where a pasty material is dosed as portions into individual containers to form individual packages, at least one dimension of the portions is measured to produce actual-value outputs that correspond to the volumes of the respective packages and that are compared with a set point corresponding to a desired volume. The dosing of the portions is altered on deviation of the volume outputs from the volume set point so as to bring same into agreement. In addition the packages are weighed downstream to produce actual-value outputs that correspond to the weights of the packages and that are compared with a set point corresponding to a desired weight. The volume set point is then altered on deviation of the weight outputs from the weight set point by increasing the volume set point when the actual-value weight outputs are below the weight set point and decreasing the volume set point when the actual-value weight outputs are above the weight set point until the actual-value weight outputs are generally the same as the weight set point.

Thus there is in effect a double feedback system. The volume of the packages is first adjusted to correspond to a desired volume. Then the packages are weighed and, if the actual weights do not correspond to the desired weight, the volume set point is altered appropriately This type of arrangement is very fast acting because the volume can be measured immediately just downstream of the dosing device for fast correction. On the other hand the weight measurement is used to double check the packages and take into account, for instance, a change in density of the material being dosed.

According to another feature of this invention a plurality of packages are weighed to produce a group weight signal. Then this group weight signal is divided by a number equal to the number of packages in the group so as to determine an average package weight that is compared with the weight set point. Similarly according to the invention a plurality of packages can be measured together and the total measurement thus obtained can be divided by the number of packages to obtain an average dimension.

Furthermore according to the invention only a portion of the deviation of the weight output from the weight set point is taken into account to alter the volume set point in order to take into account a delay between dosing of the portions into the containers and measuring their weight. This prevents hunting The deviation of the actual-value weight output from the weight set point can also be altered to take into account a scale correction factor.

It is also possible according to this invention, instead of varying the volume control signal in a system wherein individual portions are dosed into individual cells having floors to form individual packages to alter the heights of the floors of the cells. On deviation of the weight outputs from the weight set point the floors are lowered when the actual-value weight outputs are below the weight set point and the floors are raised when the actual-value weight outputs are above the weight set point until the actual-value weight outputs are generally the same as the weight set point.

The apparatus according to this invention can include an optical sensor for measuring the one dimension of the packages. This sensor is a laser proximity detector and the apparatus includes a press element vertically engageable with the packages The detector measures the vertical position of the press element. This press element is engageable with two adjacent such packages and the weighing scale is downstream of the dimension-measurer.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
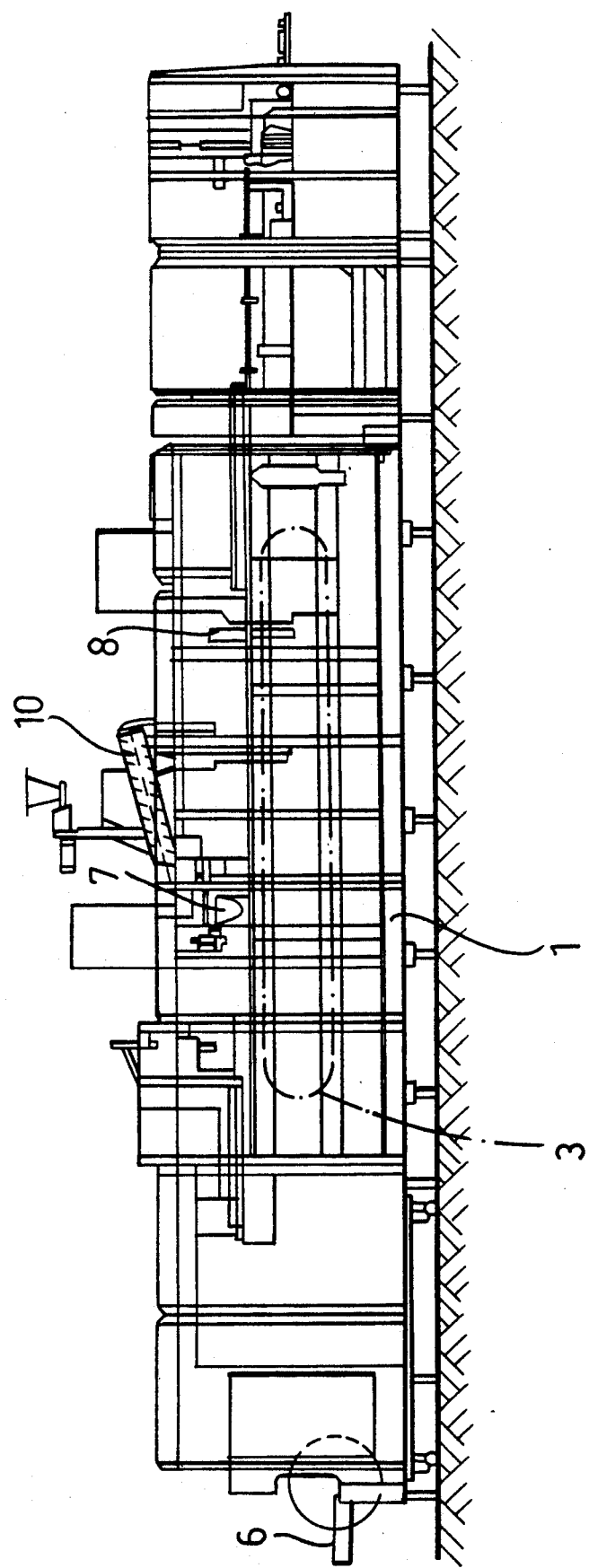
FIG. 1 is a small-scale side view of an apparatus for carrying out the method of this invention.
Figure 2:
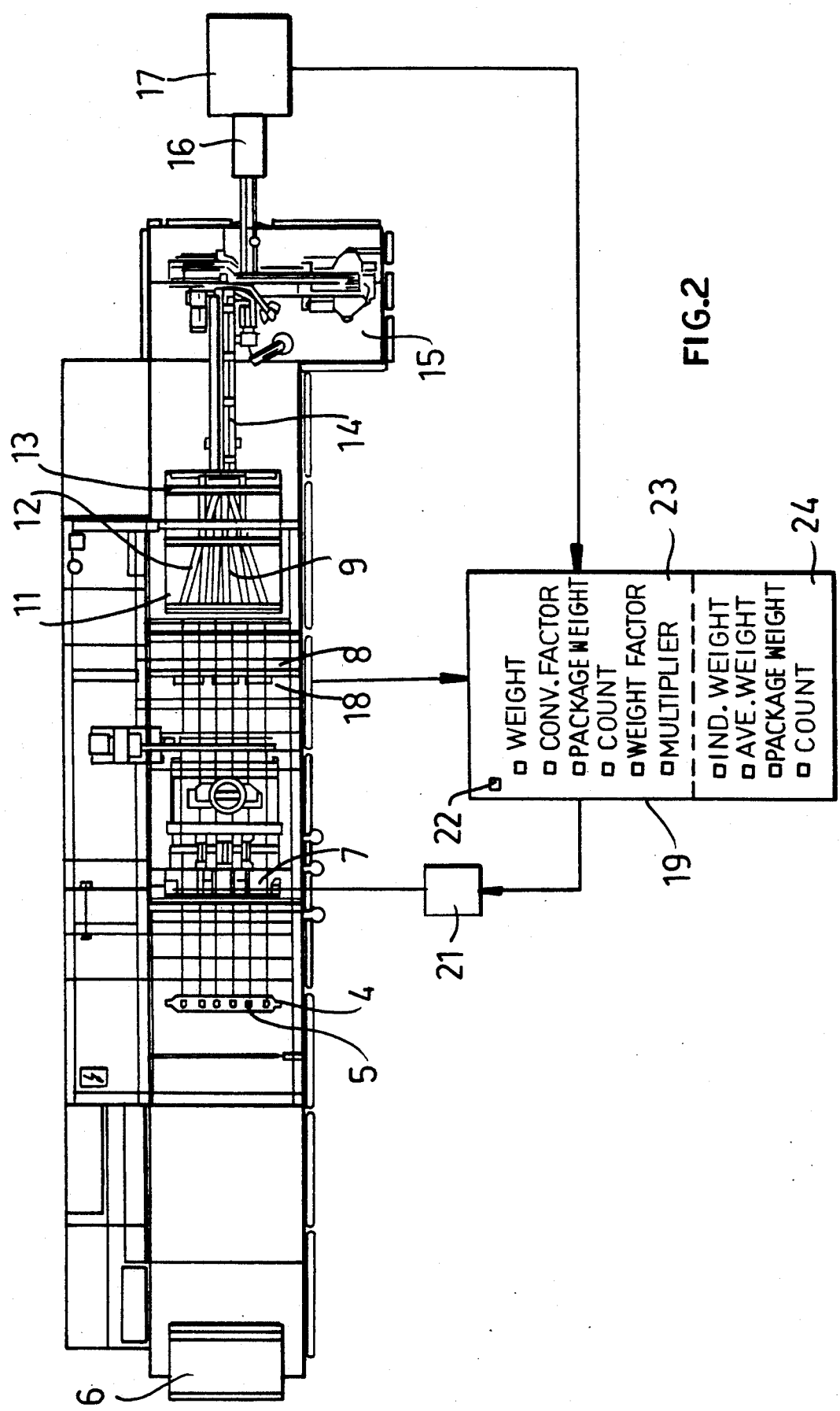
FIG. 2 is a top view of the apparatus with some parts shown diagrammatically.

As seen in FIGS. 1 and 2 a packaging apparatus according to the invention has a housing 1 on which a conveyor 2 formed by a plurality of chains 3 can move a succession of transverse bars 4 each forming a plurality, here six, of cells or pockets 5 for the formation of respective packages. These bars 4 are lined with paper or foil from a roll 6 at the upstream end of the machine. The apparatus has an adjustable dosing station 7 followed by a packing or pressing device 8 that wraps the paper or foil around the individual doses of pasty material forced by an auger 10 at the station 7 into the pockets 5.

The thus wrapped packages which each weigh only about 12 g are then picked out of the cells 5, turned, and moved together at a station 9 on table 11 downstream of the pressing apparatus 8. They move in angled grooves 12 formed in a station 9 underneath a traverse 13 at the station 9 until they are all set one against the other in a horizontal stack whose horizontal dimension may be measured. Another conveyor 14 conducts these stacks to a packing device 15 which loads them in groups of eight into cartons. Another conveyor 16 associated with a weighing machine 17 conducts the cartons each containing eight such packages away.

According to this invention a measuring device 18 is provided at the pressing/packing unit 8. As seen in FIG. 2 this device 18 is connected to a controller 19 itself connected directly to the weighing device 17 and via a control actuator 21 to the dosing unit 7. The controller 19 itself comprises a key switch 22, an input board 23, and an output or indicator board 24. In the input side 23 it is possible to input the weight (e.g. 11.6 g) of an individual package, a conversion factor (e.g. 0.75 for bouillon), package size, count, the weight factor (e.g. 100%), and the multiplier (e.g. 50%). The output side 24 reads out the individual package weight, the average package weight, the package size, and the count.

Figure 3:
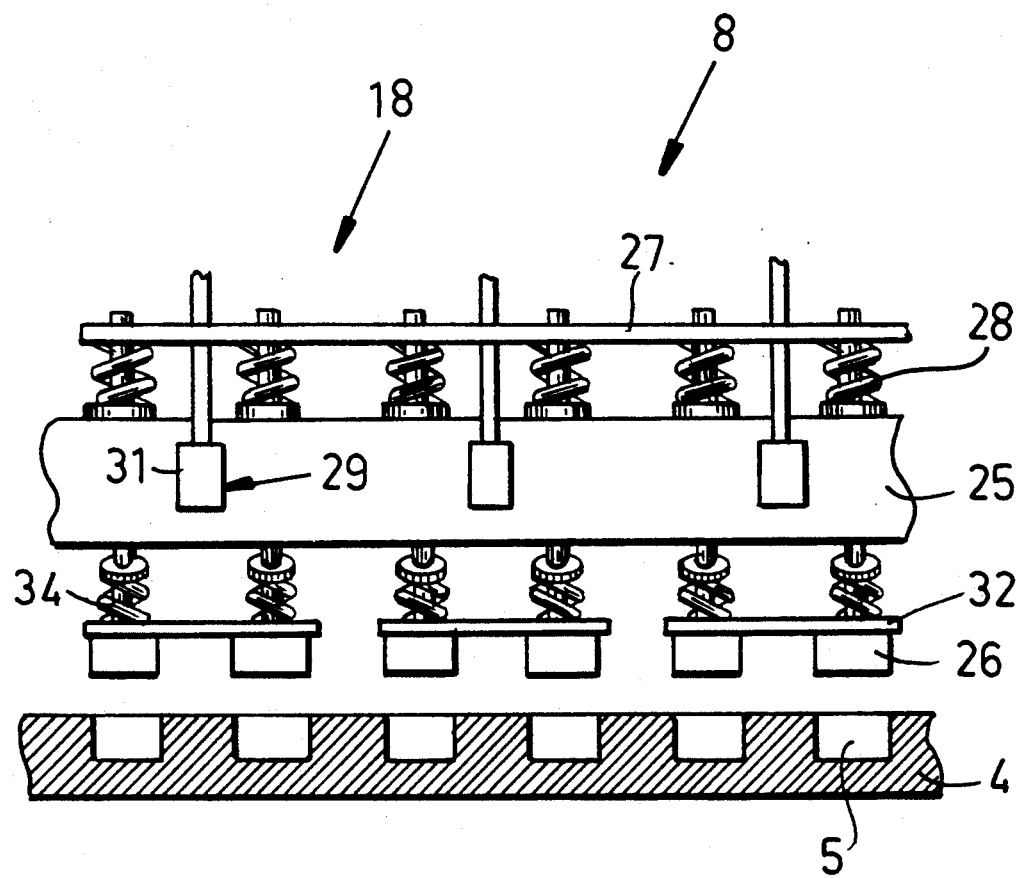
FIG. 3 is a large-scale side view of the press packing part of the apparatus.

As seen in FIG. 3 the pressing device 8 has a stationary frame 25 on which six punches 26 are vertically displaceable, each aligned with and fittable into a respective pocket 5 of the rails 4. The punches 26 are all connected to a crosswise bar 27 and are braced against the frame by respective springs 28. A laser distance-detector 29 is associated with each pair of punches 26 and comprises a signal processor 31 and a reflective bar 32 carried on the respective pair of punches 26 and braced against these punches by springs 34 so that these bars 32 can extend at a nonright angle to the displacement direction of the punches 26. In this manner if one punch moves further than the other on the bar 34, this bar 34 will extend at an angle. The detector 29 can therefore measure the strokes of the punches 26 relative to the bar 4 and can therefore measure the thickness or height of the packages formed in the cells 5. The outputs corresponding to the measured thicknesses or heights are fed to the controller 19.

The machine described above operates as follows:

The cells 5 are lined with paper from the supply 6 and are filled by the dosing unit 7 and stepped at a cycle rate of about 150 steps/min to the pressing unit 8. This device folds the paper over and makes small packages and, while doing so, the spacing measured by the detector 29 to the bar 32 indicates the height or thickness of the packages. If two packages under the same bar 32 are of different heights, the respective bar 32 will be canted so that the readout of the detector 29 will in effect be an average of the height of the two packages under the same bar 32, which of course could be extended to average the height of a plurality of packages. Since the other dimensions of each package are determined by the shape and size of the respective cell 5, this height or thickness dimension is therefore directly related to the package volume. Furthermore since the material being filled into the packages is of reasonably uniform density, the volume dimension is also fairly closely related to the weight or mass of the package. The detector 29 works by triangulation and produces a sinusoidal output ranging between 0 V and 10 V, with a maximum frequency of 2.5 Hz, so that the output voltage is directly proportional to package thickness and is at the frequency of the advance speed.

In order to avoid measuring errors the control program in the microprocessor serving as controller 19 periodically ascertains the maximum. For instance an inquiry window of 3 ms to 5 ms, with a maximum of 10 ms, is used to obtain an average value for the actual value of the thickness of the package. This gives an accuracy of $+/-0.1$ g.

The derived actual value is compared with a set point, e.g. 12.0 g, by the controller 19. This is adjusted by the conversion factor (0% to 100%) and by the multiplier (0 to 1) to respectively reduce and increase the weight. Switching on of the weight controlling unit 21 requires a minimal signal length. After another measuring cycle thresholds are again taken into account and adjusted to see if another adjustment is needed.

Figure 4:
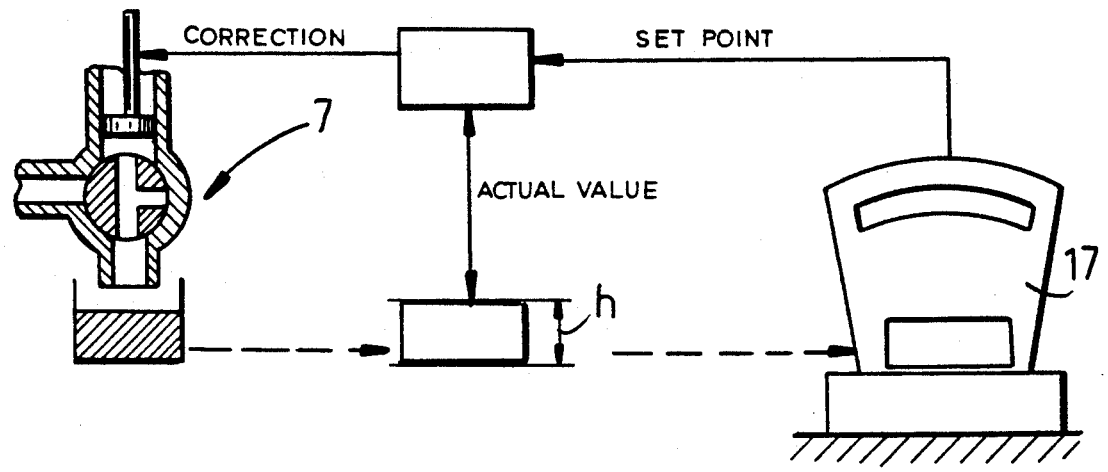
FIGS. 4 and 5 are schematic views of two feedback systems for carrying out the method of this invention.

In addition the scale 17 (See also FIG. 4) that weighs the packages is used to correct the set point (e.g. 12.0 g) discussed above. To this end according to sign the deviation is fed to one or the other input of a circuit varying the set point incrementally. The new set point is displayed on the board 24. As a result a scale-correcting factor can be set which makes it possible to avoid correction whenever deviation lies within a certain range. It is also possible to generate an alarm when the deviation exceeds a predetermined limit.

It is necessary to take certain process parameters into account in the program. The correction signal from the scale can only lie within a certain range, for instance $+/-2$ g. When this is exceeded, indicating a package weight below 10 g or above 14 g, this is a clear indication of some major trouble.

The correction is of course limited by the mechanics of the dosing mechanism 7. Once an end position typically determined by a limit switch is reached, it is only possible to correct in the other direction. If a further correction that the unit 7 cannot carry out is required, another alarm is sounded and the machine is shut down. This is also the case if one of the sensor fails or if no product at all is detected.

Figure 5:
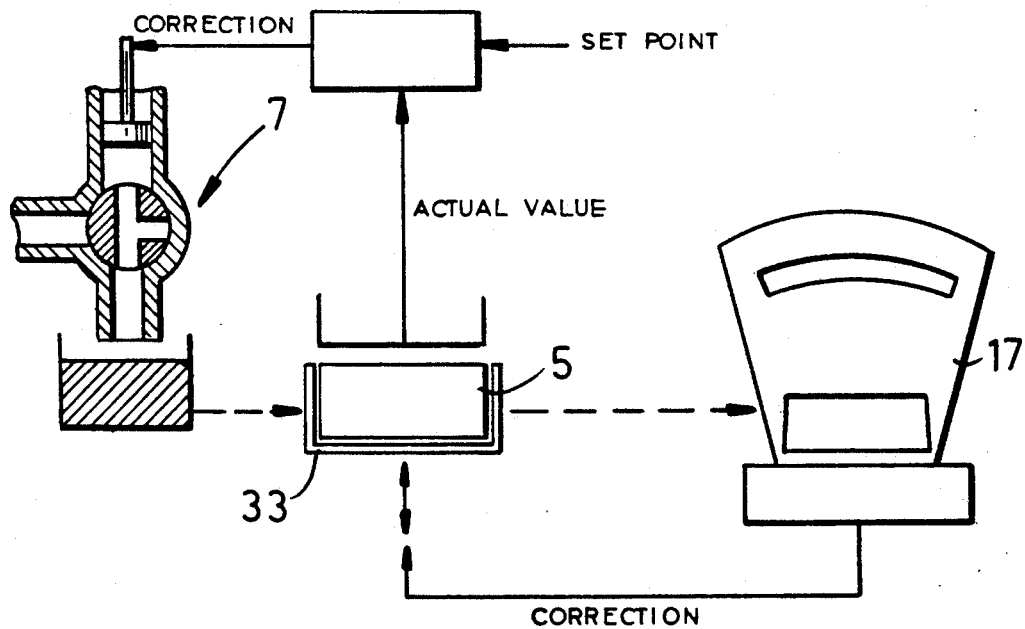

FIG. 5 shows another arrangement where, rather than correcting the set point, a movable floor 33 of the cell 5 is adjusted. Thus when the scale 17 determines that the packages are too heavy, it moves the floor 33 up a little and vice versa. This process is particularly useful in an arrangement wherein a lower pusher is used to define the floors of the cells 5, and is also normally employed to push the finished packages up out of these cells.

I claim:

1. A method of operating a packaging system wherein a pasty material is dosed as portions into individual containers to form individual packages, the method comprising the steps of:
   a) measuring at least one dimension of the doses in the containers and thereby producing actual-value outputs corresponding to the volumes of the respective doses;
   b) comparing the actual-value volume outputs with a set point corresponding to a desired volume;
   c) altering the dosing of the portions when the volume outputs deviate from the volume set point so as to make the volume outputs generally equal to the volume set point;
   d) weighing the packages after forming the packages and producing actual-value outputs corresponding to the weights of the packages;
   e) comparing the actual-value weight outputs with a set point corresponding to a desired weight; and
   f) altering the volume set point when the weight outputs deviate from the weight set point by increasing the volume set point when the actual-value weight outputs are below the weight set point and decreasing the volume set point when the actual-value weight outputs are above the weight set point until the actual-value weight outputs are generally the same as the weight set point.

2. The packaging-system operating method defined in claim 1 wherein in step d) a plurality of packages are weighed to produce a group weight signal, the method further comprising the step of
   d') dividing the group weight signal by a number equal to the number of packages in the group and thereby determining an average package weight that is used as the actual-value weight outputs and compared in step e) with the weight set point.

3. The packaging-system operating method defined in claim 1 wherein in step f) only a portion of the deviation of the weight output from the weight set point is taken into account to alter the volume set point in order to take into account a delay between dosing of the portions into the containers and measuring their weight.

4. The packaging-system operating method defined in claim 1, further comprising the step of
   g) adjusting the deviation of the actual-value weight output from the weight set point by a scale correction factor.

5. The packaging-system operating method defined in claim 1 wherein a plurality of such packages are formed simultaneously by filling respective cells with the pasty material and packing the material in the cells with respective punches, the one dimension being measured by determining the positions of the punches as same pack the respective cells.

6. A method of operating a packaging system wherein a pasty material is dosed as portions into individual containers to form individual packages, the method comprising the steps of:
   a) measuring at least one dimension of the portions and thereby producing actual-value outputs corresponding to the volumes of the respective packages;
   b) comparing the actual-value volume outputs with a set point corresponding to a desired volume;
   c) altering the dosing of the portions when the volume outputs deviate from the volume set point so as to make the volume outputs generally equal to the volume set point;
   d) weighing the packages and producing actual-value outputs corresponding to the weights of the packages;
   e) comparing the actual-value weight outputs with a set point corresponding to a desired weight; and
   f) when the weight outputs deviate from the weight set point altering the volume set point by taking into account only a portion of the deviation of the weight outputs from the weight set point by increasing the volume set point when the actual-value weight outputs are below the weight set point and decreasing the volume set point when the actual-value weight outputs are above the weight set point until the actual-value weight outputs are generally the same as the weight set point, whereby a delay between dosing of the portions into the containers and measuring of their weight is compensated for by using only a portion of the deviation.

* * * * *